(12) United States Patent
Lin

(10) Patent No.: US 11,161,453 B2
(45) Date of Patent: Nov. 2, 2021

(54) BRAKING APPARATUS AND WARNING TRIANGLE DEPLOYING THE BRAKING APPARATUS

(71) Applicant: HONGFUJIN PRECISION ELECTRONICS(TIANJIN)CO., LTD., Tianjin (CN)

(72) Inventor: Ke-Cheng Lin, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/998,180

(22) Filed: Aug. 20, 2020

(65) Prior Publication Data

US 2021/0197718 A1  Jul. 1, 2021

(30) Foreign Application Priority Data

Dec. 27, 2019 (CN) .......................... 201911381254.1

(51) Int. Cl.
*B60Q 7/00* (2006.01)
*G09F 13/16* (2006.01)

(52) U.S. Cl.
CPC .............. *B60Q 7/005* (2013.01); *G09F 13/16* (2013.01)

(58) Field of Classification Search
CPC .................................................... B60Q 7/005
USPC ........................................................ 116/63 T
See application file for complete search history.

(56) References Cited

U.S. PATENT DOCUMENTS

| 5,048,451 A * | 9/1991 | Reimers | B60Q 1/52 116/35 A |
| 5,195,264 A * | 3/1993 | Johanson | B60Q 1/50 248/911 |
| 5,450,058 A * | 9/1995 | Collier | B60Q 1/305 340/473 |
| 9,235,210 B2 * | 1/2016 | Zhang | B60Q 7/00 |
| 9,741,274 B1 * | 8/2017 | Elmer | G09F 7/20 |
| 2009/0064552 A1 * | 3/2009 | Columbia | G09F 21/04 40/591 |
| 2017/0210287 A1 * | 7/2017 | Xia | G08G 1/0955 |
| 2019/0308561 A1 * | 10/2019 | Siegler | B60R 13/011 |

FOREIGN PATENT DOCUMENTS

| CN | 202574173 U | 12/2012 |
| TW | 201905285 A | 2/2019 |

* cited by examiner

*Primary Examiner* — Kerri L McNally
(74) *Attorney, Agent, or Firm* — ScienBiziP, P.C.

(57) ABSTRACT

A self-applying braking apparatus to prevent wind-blown movement of a mobile device includes a main body, a resisting member, a retaining member, a pushing member, and a mounting member. The braking apparatus is mounted on an application device by the mounting member. The retaining member provides an elastic force to fix the main body on the application device. The resisting member is disposed on the main body and configured to abut the tarmac or ground to prevent the mobile device from moving. The pushing member is disposed on the main body and is configured to push the resisting member to abut the ground when blown by the wind or by turbulence from a passing vehicle in a predetermined direction, when greater than the elastic force. The braking apparatus prevents unwanted wind-blown movement.

12 Claims, 7 Drawing Sheets

BRAKING APPARATUS AND WARNING TRIANGLE DEPLOYING THE BRAKING APPARATUS

FIELD

The subject matter herein generally relates to road traffic.

BACKGROUND

A warning triangle can be placed behind a vehicle that has stopped on a highway. However, in the event of strong wind, the warning triangle may be blown over or blown away, which is unsafe.

BRIEF DESCRIPTION OF THE DRAWINGS

Implementations of the present technology will now be described, by way of embodiment, with reference to the attached figures.

DETAILED DESCRIPTION

Figure 1:
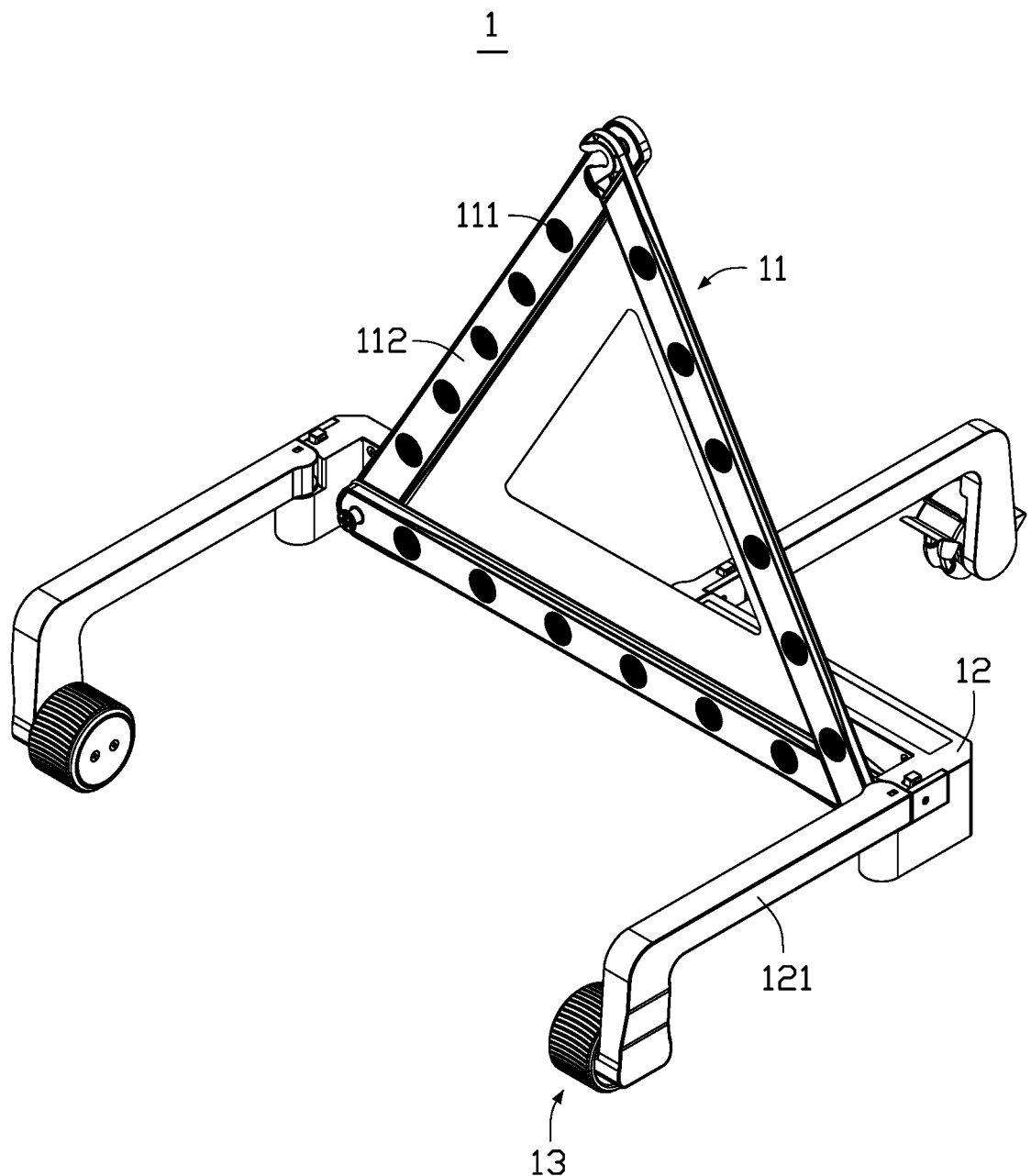
FIG. 1 is an assembled, isometric view of an embodiment of a warning triangle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
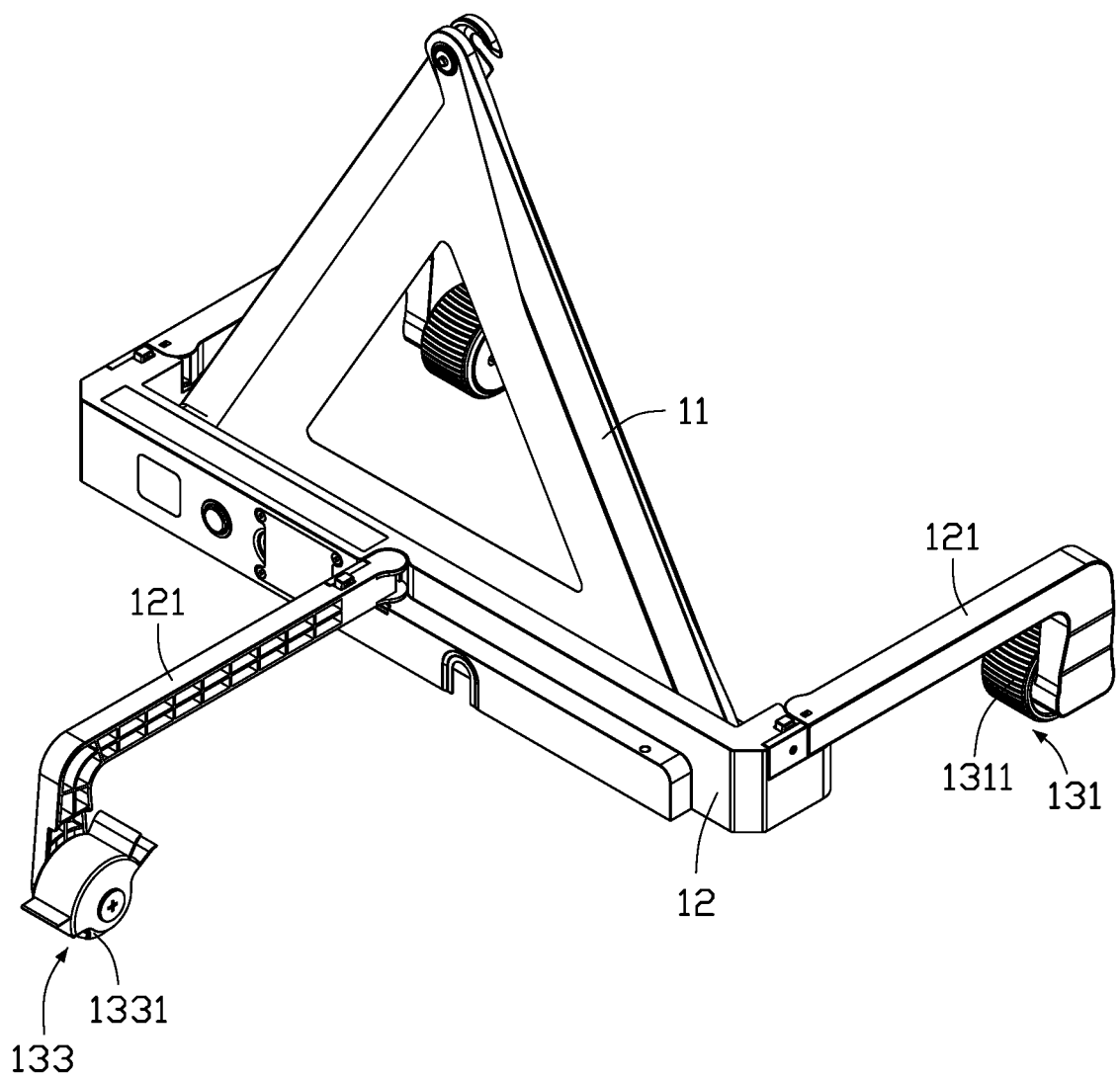
FIG. 2 is similar to FIG. 1, but viewed from another angle.

FIGS. 1 and 2 illustrate a warning triangle 1 in one embodiment. The warning triangle 1 includes a warning board 11, a base 12, and a plurality of walking devices 13. The warning board 11 is disposed on the base 12. The walking devices 13 are disposed under the base 12 and allow the base 12 to move.

In one embodiment, the warning board 11 is provided with a plurality of warning lights 111 and includes a warning surface 112. The light emitted by the warning lights 111 passes through the warning surface 112 to warn following vehicles. In other embodiments, the warning surface 112 is provided with reflecting materials (not shown) which reflect light to warn following vehicles, or the warning board 11 is provided with the warning lights 111 and reflecting materials. In the description, "front" side of the warning board 11 refers to the side of the warning board 11 seen by following vehicles, "rear" side of the warning board 11 refers to the other side, that is, the side of the warning board 11 not seen by following vehicles.

In one embodiment, the warning board 11 is erected on the base 12, and the warning board 11 is fixedly mounted to the base 12. In other embodiments, the warning board 11 may be detachably mounted on the base, and the warning board 11 may be foldable. To use, the warning board 11 is erected on the base 12, and when not in use, the warning board 11 is folded on the base 12. For example, the warning board 11 may be rotated out to an erected or deployed state and rotated into a folded or non-deployed state.

The base 12 is provided with a plurality of supporting rods 121, the walking devices 13 are disposed on the supporting rods 121. In one embodiment, the base 12 is provided with three supporting rods 121, the three supporting rods 121 constitute a tripod supporting the base 12. Two of the supporting rods 121 are located on the front side of the warning board 11, and the other supporting rod 121 is located on the rear side of the warning board 11. That is, two of the supporting rods 121 are located in front of the warning board 11, and the other supporting rod 121 is located behind the warning board 11. Each of the supporting rods 121 is provided with one walking device 13. In other embodiments, the number of the supporting rods 121 may be more than three, and the number of walking devices 13 may also be more than three. In some embodiments, each of the supporting rods 121 may be provided with more than one walking device 13.

The three walking devices 13 include two active walking devices 131 and one passive walking device 133. The two active walking devices 131 are located on the front side of the warning board 11, and the passive walking device 133 is located on the rear side of the warning board 11. That is, the two active walking devices 131 are located in front of the warning board 11, and the passive walking device 133 is located behind the warning board 11. Each of the two active walking devices 131 includes a roller 1311 and a driving device 1313 (shown in FIG. 3). The driving device 1313 drives the roller 1311 to roll, thereby driving the warning triangle 1 to move. The passive walking device 133 includes a roller 1331, the roller 1331 is passively rolled along with any movement of the warning triangle 1.

Figure 3:
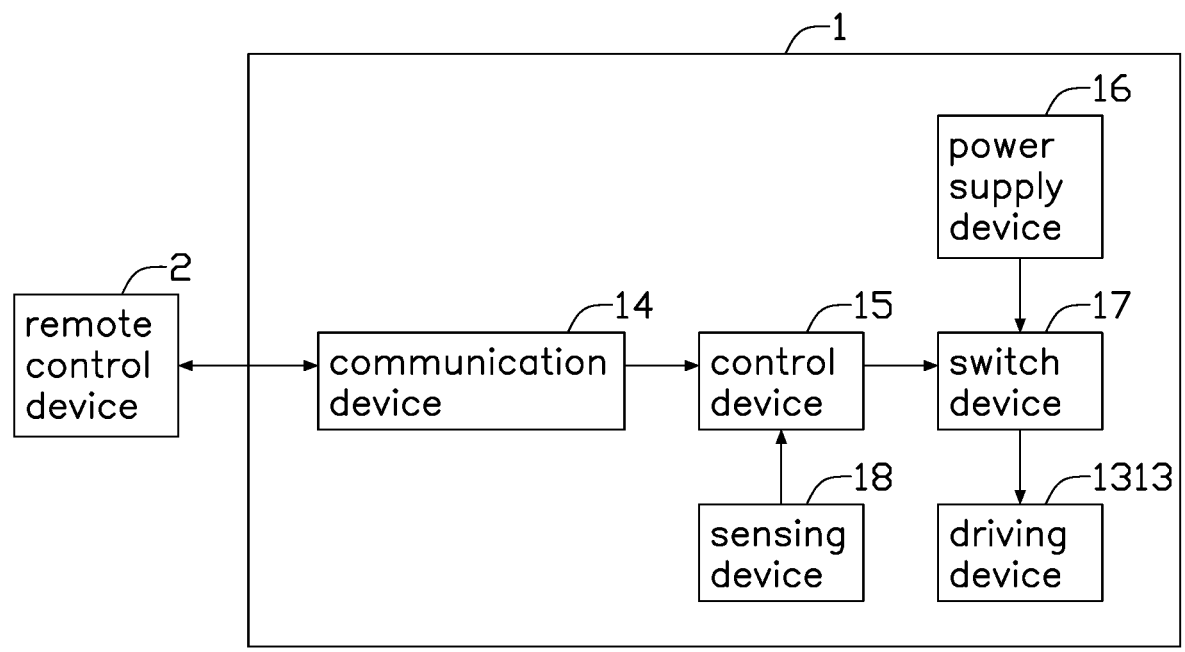
FIG. 3 is a block diagram of an embodiment of a warning triangle.
Figure 4:
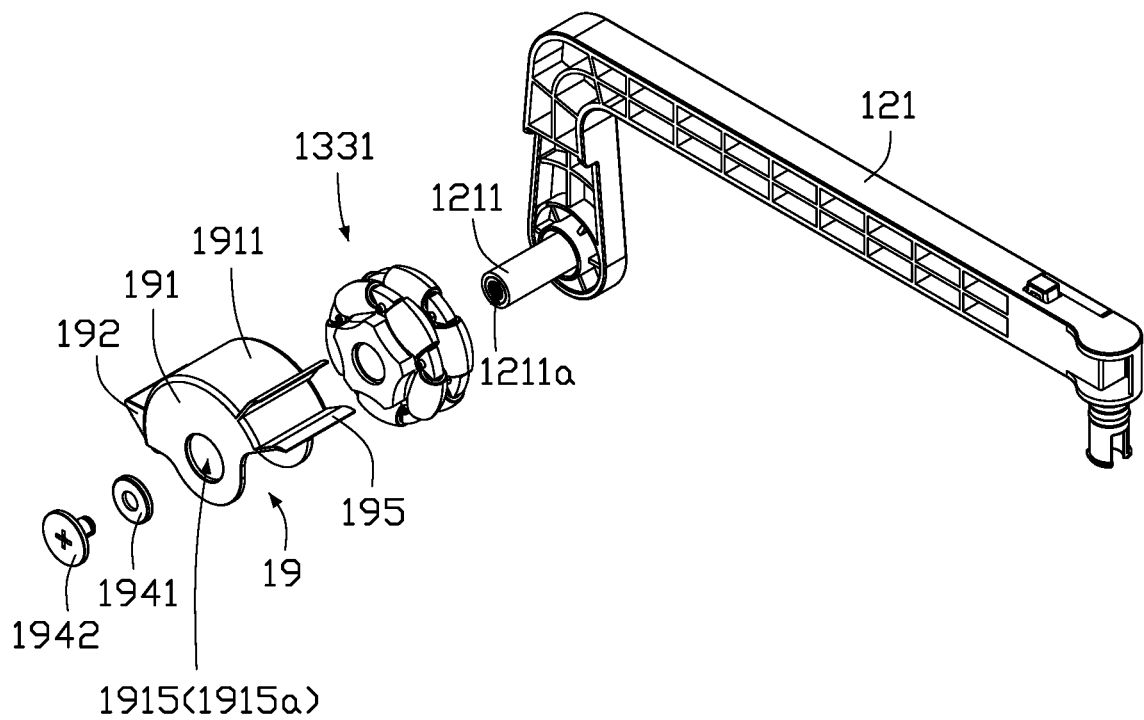
FIG. 4 is an exploded, isometric view of a braking apparatus of the warning triangle of FIG. 1.
Figure 5:
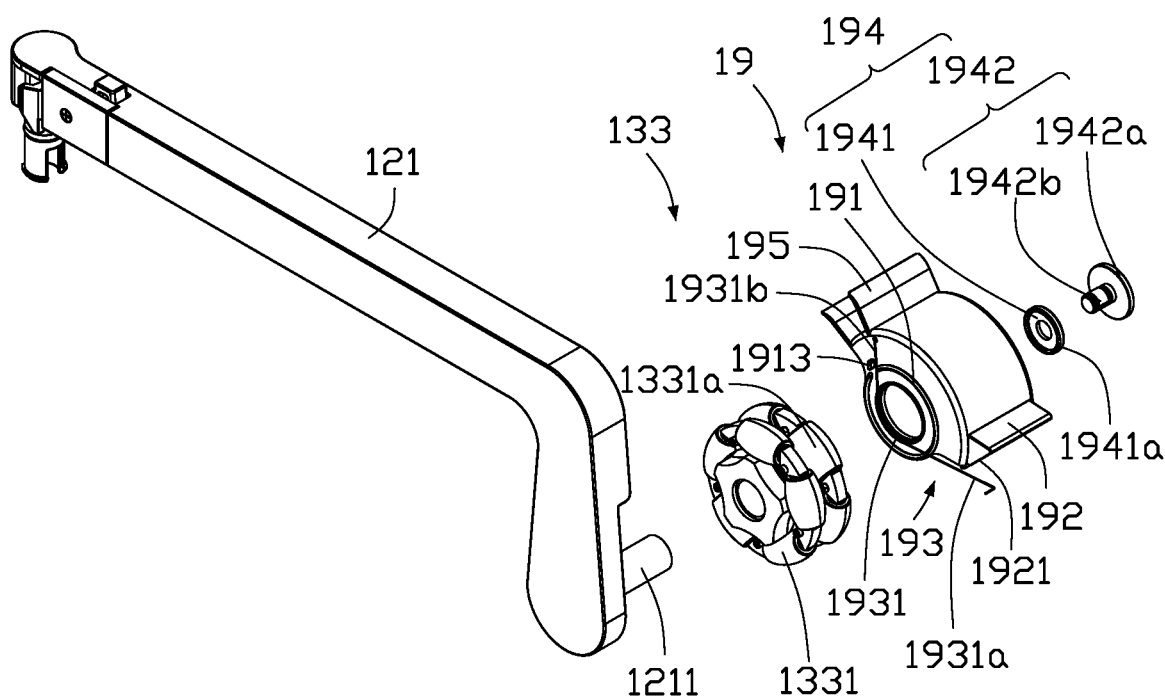
FIG. 5 is similar to FIG. 4, but viewed from another angle.
Figure 6:
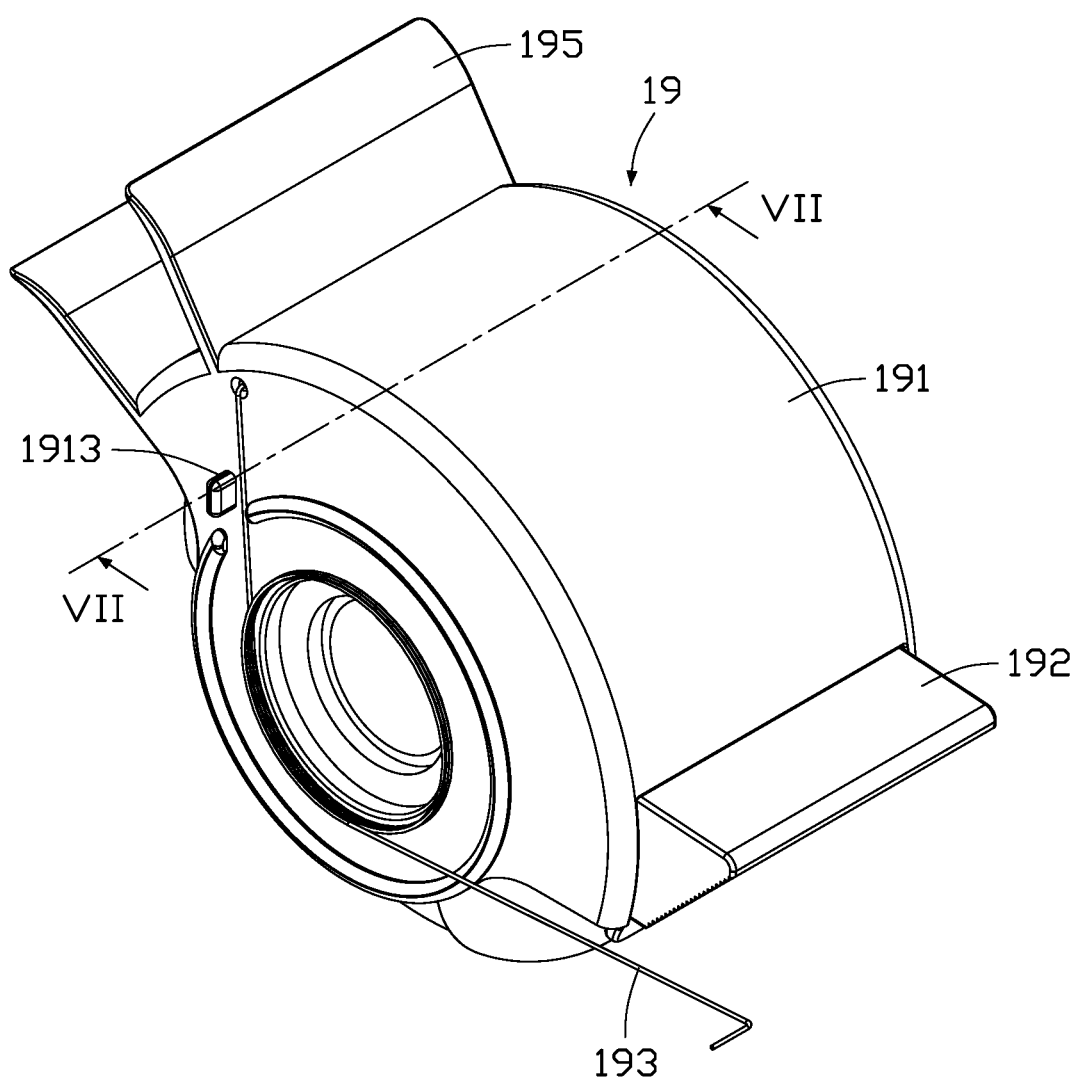
FIG. 6 is an isometric view of the braking apparatus of FIG. 4 which is assembled to a walking device.
Figure 7:
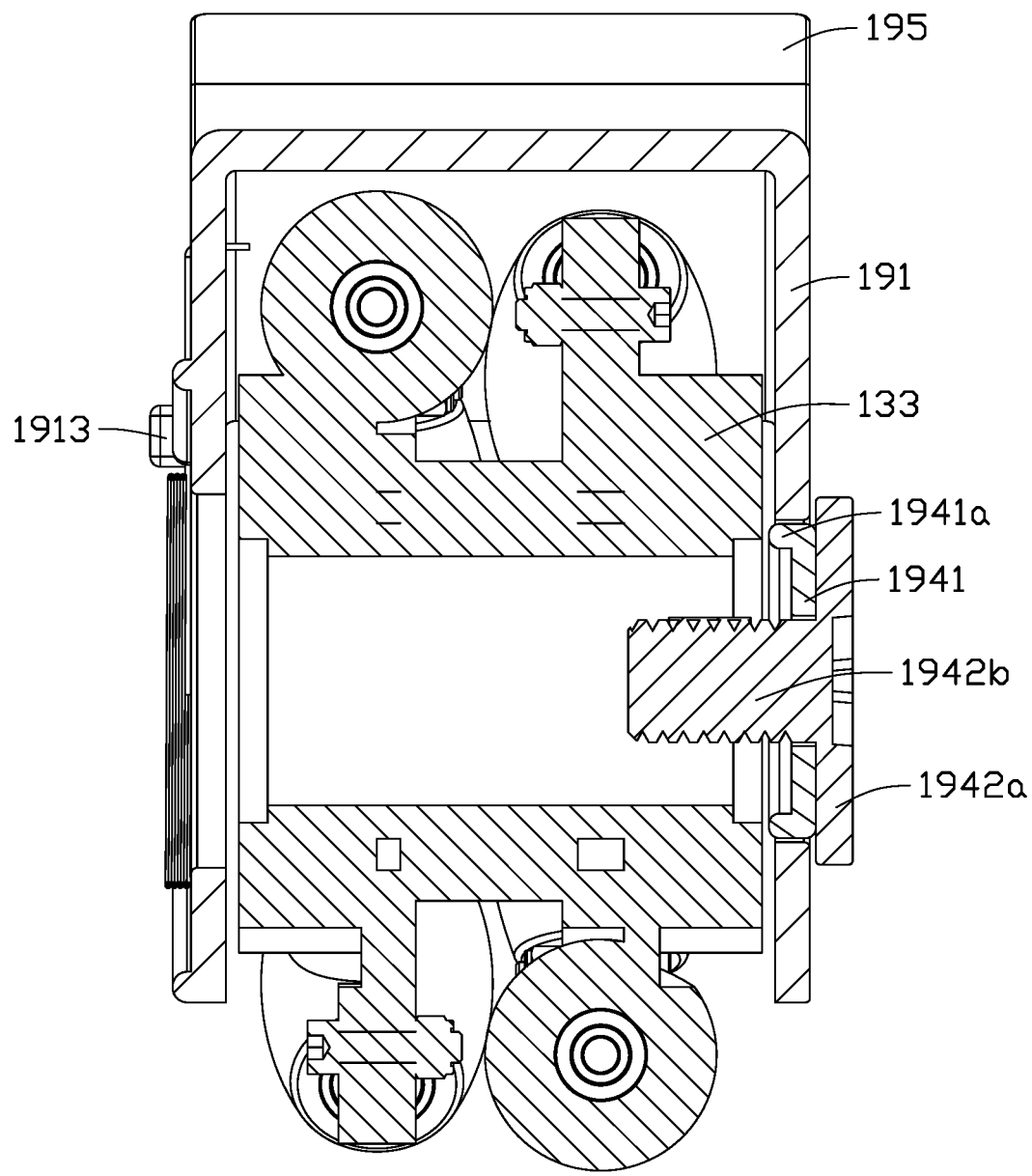
FIG. 7 is a cross-sectional view along line VII-VII of FIG. 6.

Referring to FIG. 3, the warning triangle 1 can be remotely controlled. The warning triangle 1 further includes a communication device 14, a control device 15, a power supply device 16, and a switch device 17. The communication device 14 communicates with a remote control device 2. The communication device 14 is configured to receive commands from the remote control device 2 and transmit the commands to the control device 15. The control device 15 controls the switch device 17 according to the commands to start or stop the driving device 1313. In some embodiments, the control device 15 is further configured to control the switch device 17 according to the commands to change the amount of current supplied by the power supply device 16 to the driving device 1313, thereby changing a rotation speed of the roller 1311 driven by the driving device 1313, thereby changing a moving speed of the warning triangle 1. In some embodiments, the control device 15 is further configured to calculate a moving distance of the warning triangle 1 according to the rotation speed of the roller 1311 and configured to feedback the distance moved to the remote control device 2 through the communication device 14, so that the remote control device 2 can determine a stop position of the warning triangle 1. The warning triangle 1 can further include a sensing device 18 for example. The sensing device 18 may be disposed on one of the supporting rods 121 and measure the rotation speed of the roller 1311, or the sensing device may also be disposed on the roller 1311 to measure the rotation speed of the roller 1311. The sensing device 18 transmits the measured rotation speed of the roller 1311 to the control device 15, and the control device 15 calculates the moving distance of the warning triangle 1 based on the rotation speed of the roller 1311 and feedback the distance moved to the remote control device 2.

Referring to FIGS. 4 to 7, the warning triangle 1 further includes a braking apparatus 19. The braking apparatus 19 is disposed on the passive walking device 133. The braking apparatus 19 includes a main body 191, a resisting member 192, a retaining member 193, and a mounting member 194.

A shaft 1211 extends from a tail end of each of the supporting rods 121, and the roller 1331 is disposed on the shaft 1211 and can rotate around the shaft 1211. The main body 191 of the braking apparatus 19 is also mounted on the shaft 1211 by the mounting member 194. The main body 191 extends radially around the roller 1331, bends across a rim 1331a of the roller 1331, and covers the rim 1331a. The main body 191 also extends a certain distance in a circumferential direction of the rim 1331a to form an arcing surface 1911 covering the rim 1331a. The arcing surface 1911 is provided with the resisting member 192. Specifically, the resisting member 192 is fastened on a side of the arcing surface 1911 away from the rim 1331a and located at a rear end of the arcing surface 1911. The resisting member 192 and the arcing surface 1911 may be formed as an integral unit, the resisting member 192 may adhere on the arcing surface 1911, or the resisting member 192 may be otherwise fastened on the arcing surface 1911. The resisting member 192 has a resisting surface 1921, and when the resisting surface 1921 abuts the tarmac or ground, the warning triangle 1 cannot be moved. The resisting surface 1921 may be a flat surface or a concave-convex surface, and the resisting surface 1921 may be provided with microstructures or coarse structures.

The braking apparatus 19 further includes a pushing member 195. The pushing member 195 is disposed on the arcing surface 1911 and is located in front of the resisting member 192. The pushing member 195 is configured to drive the main body 191 to rotate around the shaft 1211 when pushed by the wind or breeze in a predetermined direction, so that the resisting member 192 is rotated to make stronger or fiercer contact with the ground, to prevent movement of the warning triangle 1. The pushing member 195 and the resisting member 192 are spaced apart from each other. In one embodiment, with the shaft 1211 as a center of a circle, an angle between the pushing member 195 and the resisting member 192 is 90°. In another embodiment, with the shaft 1211 as a center of a circle, the angle between the pushing member 195 and the resisting member 192 is greater than 45° and less than 135°. The pushing member 195 resembles a fin fixed on the arcing surface 1911. The fin and the arcing surface 1911 may be formed as an integral unit, the fin may adhere to the arcing surface 1911, or the fin may be otherwise fastened on the arcing surface 1911.

The retaining member 193 is configured for holding the main body 191 at a fixed position where the resisting member 192 leaves the ground when there is a very small or no pressure from the wind or breeze on the pushing member 195 in a predetermined direction. Specifically, an end of the retaining member 193 is associated with the supporting rod 121, and the other end is associated with the main body 191, so that the main body 191 is held by the retaining member 193 at the fixed position where the main body 191 is fixed relative to the supporting rod 121. Such association may refer to connecting or abutting. In one embodiment, the retaining member 193 is a torsion spring 1931, the torsion spring 1931 is sleeved on the shaft 1211, a rear end 1931a of the torsion spring 1931 abuts a side of the supporting rod 121. A front end 1931b of the torsion spring 1931 abuts a side of a limited post 1913 protruding from the main body 191 toward the supporting rod 121. The other side of the limited post 1913 away from the torsion spring 1931 abuts the other side of the supporting rod 121. The limited post 1913 is thus clamped and fixed between the torsion spring 1931 and the other side of the supporting rod 121, and the main body 191 is fixed relative to the supporting rod 121 to prevent the main body 191 from being rotated randomly or following the rotation of the roller 1331 to rotate.

In some embodiments, the front end 1931b and the rear end 1931a of the torsion spring 1931 may be respectively connected to the main body 191 and the supporting rod 121. For example, the front end 1931b and the rear end 1931a of the torsion spring 1931 may be connected to the main body 191 and the supporting rod 121 by hooking the main body 191 and the supporting rod 121. In some embodiments, the torsion spring 1931 can be replaced by other elastic members. The arrangement of the retaining member 193 holds the main body 91 at the fixed position where the main body 91 is fixed relative to the supporting rod 121 under an action of an elastic force of the retaining member 193. When an external force in or from a predetermined direction, such as wind turbulence from a passing vehicle, is applied to the pushing member 195 and such wind turbulence is greater than the elastic force, the main body 191 rotates backward, and the rear end of the main body 191 abuts the ground to prevent the warning triangle 1 from retreating.

A tail end of the shaft 1211 is provided with a screw hole 1211a. The mounting member 194 includes a collar 1941 and a screw 1942. The main body 191 is provided with a mounting structure 1915. In one embodiment, the mounting structure 1915 is a mounting hole 1915a defined on the main body 191. A diameter of the mounting hole 1915a is matched in size with an outer diameter of the collar 1941, and the collar 1941 is disposed in the mounting hole 1915a of the main body 191 corresponding to an end of the shaft 1211. A protrusion 1941a protrudes from the collar 1941 towards the roller 1331, and the protrusion 1941a abuts the roller 1331 to prevent the roller 1331 from rubbing against the main body 191 and driving the main body 191 to rotate. The screw 1942 includes a screw nut 1942a and a screw rod 1942b, the screw rod 1942b is matched in size with the screw hole 1211a, an outer diameter of the screw nut 1942a is larger than a diameter of the mounting hole 1915a, and the screw rod 1942b is screwed with the screw hole 1211a. The screw nut 1942a abuts the main body 191. The main body 191 is thus fastened to the shaft 1211.

In the previous embodiments, the braking apparatus 19 is provided on the passive walking device 133 of the warning triangle 1. In other embodiments, the braking apparatus 19 may also be provided on the active walking device 131. In order to prevent the active walking device 131 from driving the braking apparatus 19 to rotate during movement of the warning triangle 1, the braking apparatus 19 may be mounted on the supporting rod 121 instead of being mounted on a central axle or shaft (not shown) of the active walking device 131.

In the disclosure, the retaining member holds the braking apparatus at the fixed position under an action of the elastic force of the retaining member. When the warning triangle is subjected to fast-moving air, the braking apparatus reacts by rotating to abut the ground more strongly, to prevent the warning triangle from being driven back, thereby applying a braking function.

The warning triangle is an example of the application of the braking apparatus, the braking apparatus can also be applied to other application devices to hinder any unwanted movement of the other application devices.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A braking apparatus comprising:
 a main body;
 a mounting member configured to mount the main body on an application device;
 a resisting member disposed on the main body and configured to abut a ground to prevent the application device from moving;
 a retaining member providing an elastic force to fix the main body on the application device, and to hold the main body at a fixed position where the resisting member leaves the ground; and
 a pushing member disposed on the main body;
 wherein the pushing member is configured to push the resisting member to abut the ground when subjected to an external force in a predetermined direction which is greater than the elastic force.

2. The braking apparatus of claim 1, wherein the retaining member is a torsion spring, an end of the torsion spring is associated with the application device, and the other end of the torsion spring is associated with the main body, the main body is thus fixed on the application device.

3. The braking apparatus of claim 2, wherein the main body is provided with a limited post, the other end of the torsion spring is configured to abut the limited post to fix the limited post on the application device, the main body is thus fixed on the application device.

4. The braking apparatus of claim 1, wherein the main body is configured to sleeve on a passive walking device of the application device.

5. The braking apparatus of claim 4, wherein the mounting member is configured to mount the main body on a shaft around which the passive walking device rotates.

6. A warning triangle comprising:
 a supporting rod; and
 a braking apparatus comprising:
  a main body;
  a mounting member by which the main body is mounted on the supporting rod;
  a resisting member disposed on the main body and configured to abut the ground to prevent the warning triangle from moving;
  a retaining member providing an elastic force to fix the main body on the supporting rod, and to hold the main body at a fixed position where the resisting member leaves the ground; and
  a pushing member disposed on the main body;
 wherein the pushing member is configured to push the resisting member to abut the ground when subjected to an external force in a predetermined direction which is greater than the elastic force.

7. The warning triangle of claim 6, further comprising a passive walking device disposed on the supporting rod, wherein the supporting rod is provided with a shaft, the passive walking device comprises a roller, the roller is disposed on the shaft and rotates around the shaft during walking.

8. The warning triangle of claim 7, wherein the main body is mounted on the shaft by the mounting member, the main body covers the roller and comprises an arcing surface covering a rim of the roller, the resisting member and the pushing member are disposed on the arcing surface and spaced apart from each other.

9. The warning triangle of claim 8, wherein the pushing member is a fin extending outward from the arcing surface.

10. The warning triangle of claim 8, wherein the resisting member has a resisting surface, the resisting surface is a concave-convex surface.

11. The warning triangle of claim 7, wherein the main body is provided with a limited post protruding towards the supporting rod, the retaining member is configured to fix the limited post on the supporting rod, the main body is thus fixed on the supporting rod.

12. The warning triangle of claim 11, wherein the retaining member is a torsion spring, the torsion spring is sleeved on the shaft, an end of the torsion spring abuts the supporting rod, and the other end of the torsion spring abuts a side of the limited post, and the other side of the limited post away from the torsion spring abuts the supporting rod, the limited post is thus clamped and fixed between the torsion spring and the supporting rod.

\* \* \* \* \*